United States Patent
Emslie

(10) Patent No.: US 9,343,916 B2
(45) Date of Patent: May 17, 2016

(54) MODULAR CHARGING DEVICE

(71) Applicant: Signals IT Ltd., Swinton (GB)

(72) Inventor: Peter Emslie, Swinton (GB)

(73) Assignee: Signals IT Ltd., Swinton (GB)

( * ) Notice: Subject to any disclaimer, the term of this patent is extended or adjusted under 35 U.S.C. 154(b) by 616 days.

(21) Appl. No.: 13/707,180

(22) Filed: Dec. 6, 2012

(65) Prior Publication Data

US 2013/0154566 A1    Jun. 20, 2013

Related U.S. Application Data

(60) Provisional application No. 61/682,780, filed on Aug. 14, 2012.

(30) Foreign Application Priority Data

Dec. 7, 2011  (GB) .................................. 1121098.6
May 11, 2012  (GB) .................................. 1208521.3

(51) Int. Cl.
  *H02J 7/00*   (2006.01)
(52) U.S. Cl.
  CPC ............. *H02J 7/0044* (2013.01); *H02J 7/0052* (2013.01); *H02J 7/0055* (2013.01); *H02J 2007/0062* (2013.01)
(58) Field of Classification Search
  CPC ...................................................... H02J 7/0044
  USPC ................................................. 320/115, 107
  See application file for complete search history.

(56) References Cited

U.S. PATENT DOCUMENTS

| | | | |
|---|---|---|---|
| 2008/0150480 A1 | 6/2008 | Navid | |
| 2010/0176762 A1* | 7/2010 | Daymude et al. | 320/115 |
| 2011/0018360 A1 | 1/2011 | Baarman et al. | |
| 2013/0113420 A1* | 5/2013 | Majoris, Jr. | H02J 7/0044 320/107 |
| 2014/0361740 A1* | 12/2014 | Suzuki | H02J 7/0027 320/108 |
| 2014/0361751 A1* | 12/2014 | Strauser | G06F 1/266 320/137 |

FOREIGN PATENT DOCUMENTS

WO    WO2007102997    9/2007

OTHER PUBLICATIONS

Oct. 10, 2012 United Kingdom Intellectual Property Office Search Report.

* cited by examiner

*Primary Examiner* — Richard V Muralidar
(74) *Attorney, Agent, or Firm* — Ronald E. Prass, Jr.; Prass LLP

(57) ABSTRACT

A modular charging device includes a chassis, a plurality of cradle mounts and a power distribution unit including a power outlet corresponding to each of the said cradle mounts. Each mount is suitably adapted for detachably affixing a cradle to the chassis, and a charging plug of each cradle is electrically connectable to the power distribution unit via a fly lead providing an electrical connection between the said charging plug and the power outlets. The use of a modular chassis and cradle mount system may conveniently enable each cradle to be attached or detached individually, meaning that the component parts can be removed and replaced upon failure, or for upgrade, with minimal effort. Additionally, the invention suitably permits charging of multiple mobile communication devices or batteries for same.

18 Claims, 4 Drawing Sheets

MODULAR CHARGING DEVICE

CROSS-REFERENCE TO RELATED APPLICATIONS

This invention claims priority from U.S. provisional utility patent application No. 61/682,780, titled MODULAR CHARGING DEVICE (Filing date: 14 Aug. 2012), United Kingdom patent application No: GB1121098.6, titled MODULAR CHARGING DEVICE (Filing date: 7 Dec. 2011), and United Kingdom patent application No: GB1208521.3, titled Modular Charging Device (Filing date: 11 May 2012), the disclosures of which are each incorporated herein by reference in their entireties.

FIELD OF DISCLOSURE

This invention relates to modular charging devices, and in particular, but without limitation, to chargers suitable for charging multiple devices simultaneously.

BACKGROUND

There is a growing need nowadays for portable computers. One particular industry where the use of portable computers is the logistics industry where delivery drivers are provided with hand-held devices incorporating scanners, cameras and touchscreens that they can use to track the location and delivery of packages. The portable computer is in almost constant use throughout the day, so needs to be regularly re-charged if the battery is to remain sufficiently charged to power the device effectively.

Each, say, delivery driver may therefore be issued with a hand-held computer, which is returned to base at the end of each shift, along with other loaned equipment, for example, vehicles, documents, personal protective equipment and other items that need to be inventoried and maintained. Each hand-held computer usually requires a specific type of charger which delivers an appropriate voltage via an appropriate plug-type connector. Since fly leads can easily become damaged and tangled, it is customary to use a docking station to recharge each hand-held device that contains a recess, which to avoid docking devices in the wrong docks, is usually shaped to receive only one type of device. The dock has an in-built charging plug, which engages with the charging socket of the device automatically when the device is seated correctly in its dock.

Where large numbers of hand-held devices are used, it is often more convenient to purchase a so-called bank-charger, which combines a number of individual docking stations into a single unit. Such an arrangement conveniently enables a number of identical devices to be charged simultaneously, whilst sharing a common power supply lead, which reduces the number of trailing wires that are needed. This known solution has been found to be quite satisfactory in the majority of cases.

Nevertheless, docking stations, and in particular, multi-docking or bank-charger stations are relatively expensive items, and are susceptible to damage or failure. If one dock of a bank-charger is broken, often the entire bank stops working, and the solution is to replace the bank, or to send the entire bank away for repair, which can be costly and inconvenient.

Furthermore, when it comes to upgrading a fleet's hand-held devices, or as devices are lost/broken and replaced, there are often number of different devices being used at the same time by different users. This can create problems inasmuch as it is possible for users to attempt to dock devices in the wrong docks, which increases the risk of damage occurring.

United States patent application No: US 2008/0150480 discloses several embodiments of charging system for a video game controller. It teaches a charging base having two docking stations that receive a respective adaptor and to which a respective hand held controller connects. Integral electrical connections are provided between the base and the adaptors rather. This document does not disclose a wall-, or server cabinet-, mounting arrangement.

United States patent application No: US 2011/0018360 discloses a universal power supply for wired and wireless devices. Multiple wireless power transmitters are disclosed which connect with a power supply base via a respective wired connection, the connection to the device to be charged being wireless. The cradle mounts disclosed in this document do not positively engage the devices being charged—being shelves upon which devices can be placed, thus this document does not disclose a physical connection between the charger and the device, a separate electrical connection, or wall- or server case-, mounting.

International patent application No: WO 2007/102997 discloses a battery charger having a base and several pods for batteries. The pods include the connections for the batteries and the pods connect with the base and have integral electrical connections. There is no fly lead connecting the charger to the device since power passes through integrally-formed connectors in the device cradle.

United States patent application No: US 2010/0176762 discloses a device for storing and charging a plurality of devices. The holders are shelf-like and may have integral electrical connections for the device to be charged.

The prior art therefore suffers from the disadvantages outlined above, namely manufacturing complexity and cost, a general lack of ruggedness and a lack of provision to facilitate part replacement by non-specialist operatives.

A need therefore arises for a versatile multi-charger, which can be used with a range of hand-held devices and which overcomes one or more of the problems outlined above.

SUMMARY OF THE INVENTION

According to the invention, there is provided a modular charging device suitable for use with mobile communication devices that is modular to allow on site user repair or modification.

A second aspect of the invention provides a modular charging device comprising a chassis, a plurality of cradle mounts and a power distribution unit comprising a power outlet corresponding to each of the said cradle mounts.

Each mount is preferably adapted for detachably affixing a cradle to the chassis. The cradles are preferably removable and interchangeable so that different cradles can be attached to the chassis to recharge different devices. A plug and wire-type connection is preferably used to connect the wiring of each cradle to the chassis, or electrical connections can be made via electrical contacts of the cradle mounts.

The or each cradle, where provided, is preferably specifically adapted to receive a particular model of portable, or hand-held, rechargeable device and may comprise a plug-type power connector that engages with a charging socket of the said device when the said device is correctly seated in the cradle. Power to the plug-type power connector can be delivered via a fly lead, which is preferably detachably connectable to a socket of the power distribution unit of the modular charging device.

The use of the chassis and cradle mount system may conveniently enable each cradle to be attached or detached individually. The cradles are separate to the chassis, but are attached using mounts. Such a configuration means that the component parts of the device can be removed and replaced upon failure or for upgrade, with minimal effort and by a user, as opposed to by a specialist engineer. The interchangeability of the invention may thus conveniently allow for ease of maintenance by the user (thereby reducing costs) and may facilitate future upgrades for mobile communication devices as they are upgraded over time. In addition, the invention may provide the ability to charge multiple mobile communication devices or batteries for said devices.

The cradles may be identical or different, which may allow a single modular charging device to be used with a number of different types of hand-held or portable devices. Moreover, if any one cradle becomes damaged, it can be a relatively simple matter to swap the damaged cradle for another, without affecting the operation of the other cradles affixed to the chassis. Such a configuration greatly facilitates maintenance of the modular charging device, and allows a common modular charging device to be used simultaneously with a range of different devices to be charged.

The power distribution unit preferably comprises a transformer for converting mains electricity into a suitable charging voltage for the devices, for example, 6V DC. Additionally or alternatively, the power distribution unit may comprise a network interface via which a "power-over-Ethernet" voltage may be delivered to each cradle, and hence, to each device attached thereto.

The modular charging device can be wall, floor, desk and/or cabinet mounted. The chassis may be wall mountable, in which case a wall-mounting bracket or brackets may be provided to facilitate detachable attachment of the chassis to a wall or other vertical surface. Additionally or alternatively, the chassis may be supported on feet to allow it to rest on a horizontal surface or table top. In a most preferred embodiment of the invention, the dimensions of the chassis are selected to correspond to the internal dimensions of a rack mount server cabinet (e.g. having a width of approximately 19") such that one, or several, modular charging devices can be housed within a secure and/or portable housing.

The power distribution unit preferably comprises a mains transformer, which is preferably located on the exterior of the chassis to enable it to be easily replaced for servicing and/or upgrade. The mains transformer, where provided, preferably connects to a PCB within the chassis that comprises power regulation and distribution circuitry that delivers a controlled voltage and/or current to each of the cradles.

BRIEF DESCRIPTION OF THE DRAWINGS

Preferred embodiments of the invention shall now be described, by way of example only, with reference to the accompanying drawings in which.

DETAILED DESCRIPTION OF EMBODIMENTS

Figure 1:
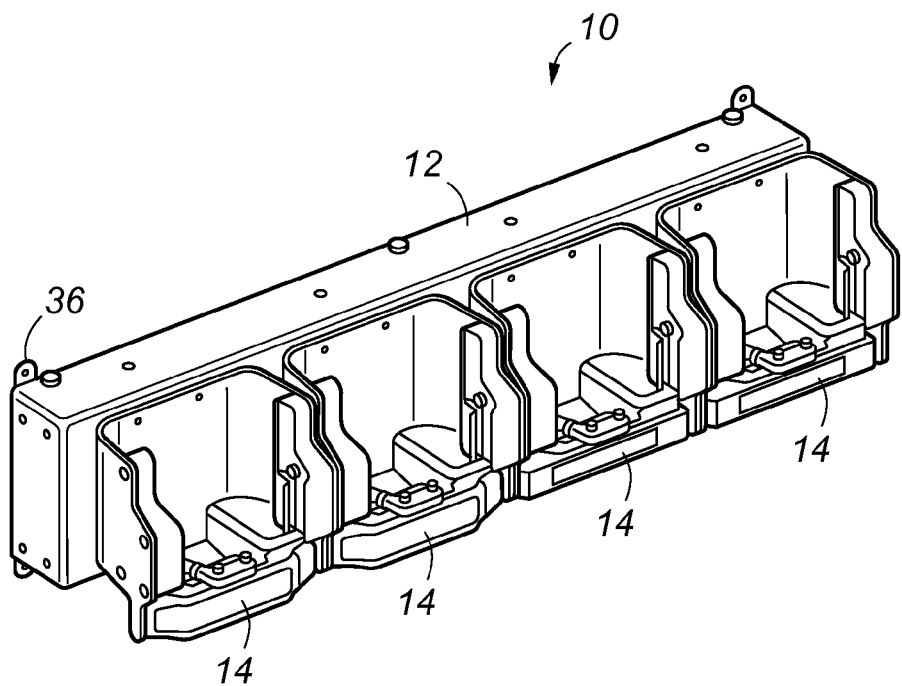
FIG. 1 is a perspective view of a modular charging device according to the invention with four cradles attached.

In the drawings, a modular charging device 10 comprises a chassis 12 formed from a pressed steel box (for strength and durability), which houses an internal circuit board (not visible) for distributing power to each of the cradles 14. The chassis 12 comprises two components, namely a front fascia assembly 12 and a back assembly 13. The front fascia assembly 12 has a generally U-shaped cross-section and is manufactured from folded sheet metal or from injection molded plastics. The back assembly 13 can also be manufactured from folded sheet metal, having a generally rectangular shape that nests within, and which is clipped of otherwise fastened to a recess of the front fascia assembly 12.

On the front face 16 of the chassis 12, there are provided four, equally-spaced-apart mounts 18, each comprising a plastics injection molded quick release ratchet plate, to which cradles 14 can be detachably affixed. The mounts 18 are industry-standard to enable a range of different cradle types to be affixed thereto.

Power is brought to the device 10 by a standard DC power supply 20 connecting via a jack plug connection 26 to the underside of the chassis 12. An LED 21 confirms power has reached the unit 10. Power is then distributed internally to each of the cradles 14 individually, which connect to the chassis 12 via a female jack-type connector 28.

Figure 3:
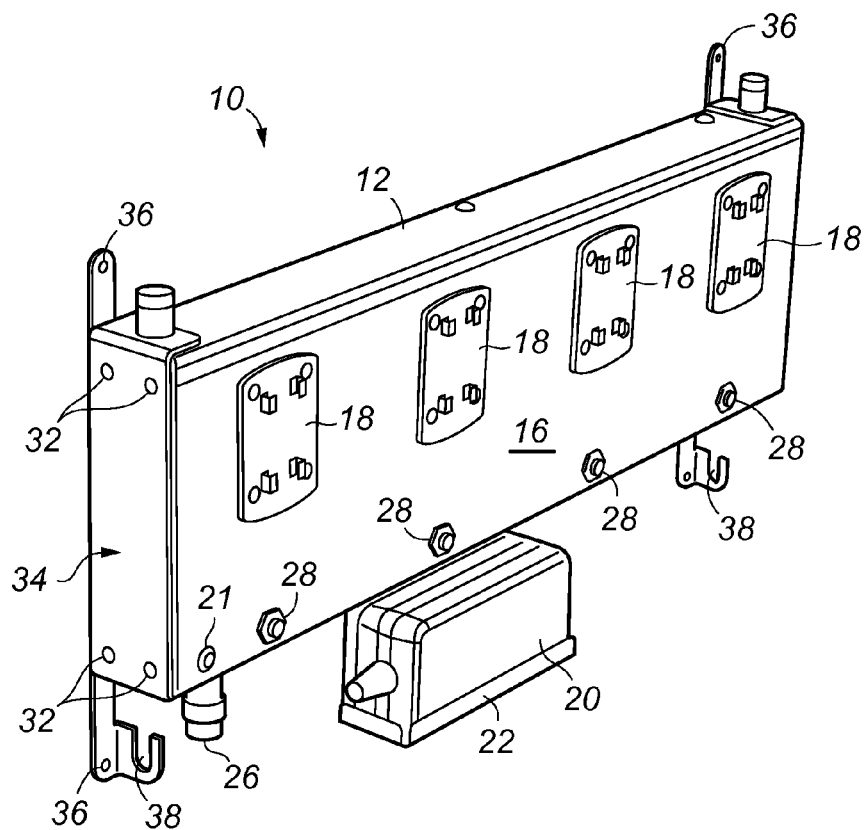
FIG. 3 is a perspective view of a wall-mountable version of the modular charging device of FIGS. 1 and 2 with no cradles attached.
Figure 5:
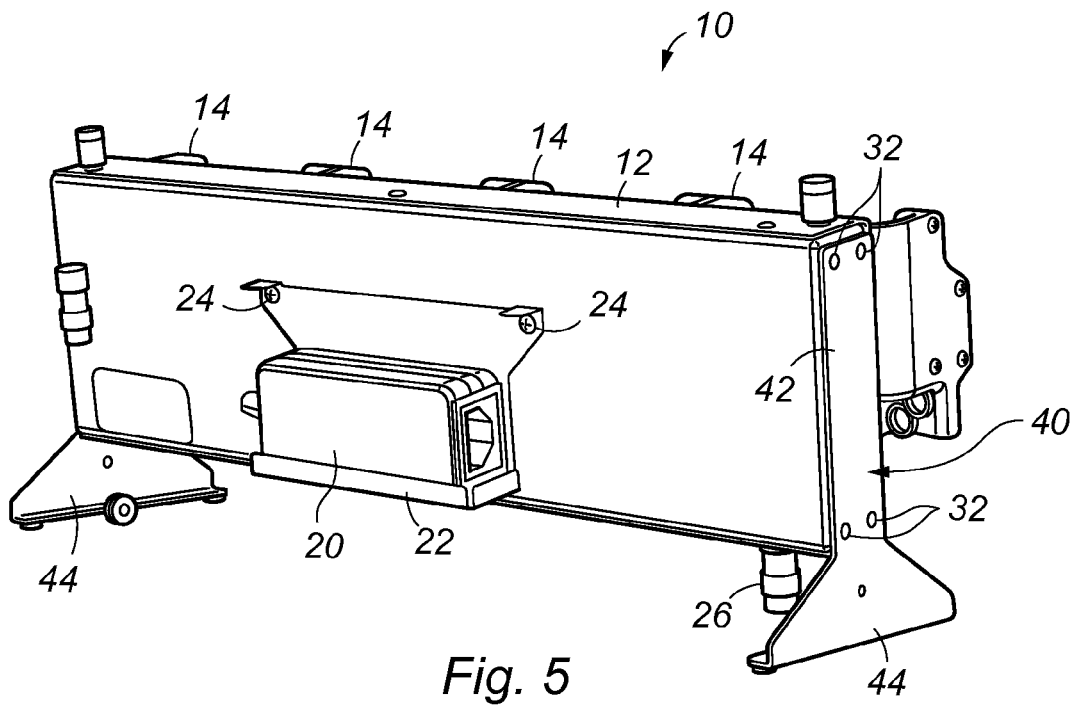
FIG. 5 is a perspective view from behind of the desk-mountable modular charging device of FIG. 4.

A mains power transformer 20 is supported on the chassis 12 by a cradle 22, which can either be suspended below the chassis 12, as shown in FIG. 3, or screwed to its rear surface, as shown in FIG. 5. The transformer cradle 22 comprises a generally J-cross section plate providing a tray for supporting the transformer 20. The transformer cradle 22 can be affixed to the chassis using screws 24 that engage pre-drilled screw holes 26. The mains transformer 20 is connected to a mains power supply (not shown) and has a fly lead (not shown) that connects to a power inlet socket 26 of the chassis 12. The power inlet socket 26 is electrically connected to the PCB (not visible) within the chassis 12 that distributes power to each of four power outlet sockets 28 located on the front face 16 of the chassis 12.

The cradles 14 each have a fly lead 30 with a plug 31 that can be plugged into one of the power outlet sockets 28, thereby providing electrical power to each cradle 14. When a device (not shown) is correctly seated within one of the cradles 14, electrical power flows from the mains power supply to the device to recharge it.

Figure 2:
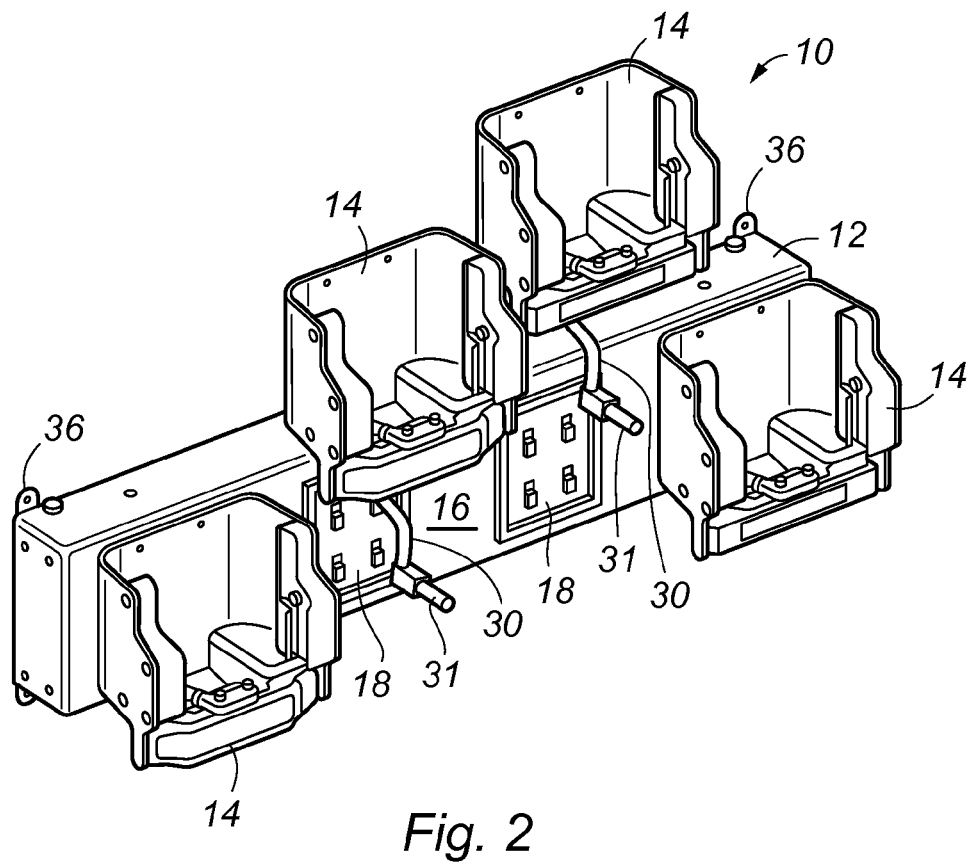
FIG. 2 is a perspective view of the modular charging device of FIG. 1 with two cradles removed.
Figure 6:
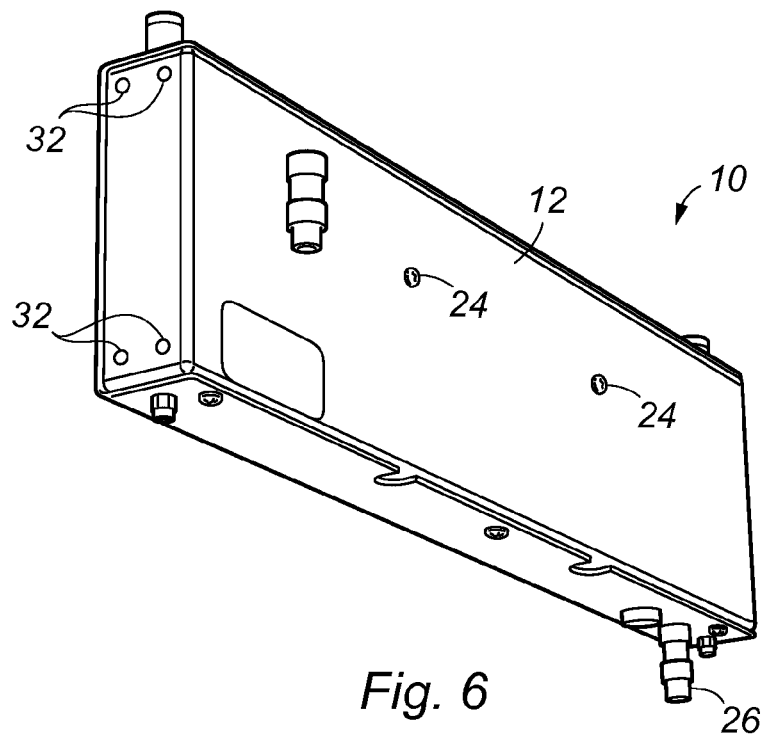
FIG. 6 is a perspective view from behind of the chassis of the modular charging device of FIGS. 1 to 5.
Figure 7:
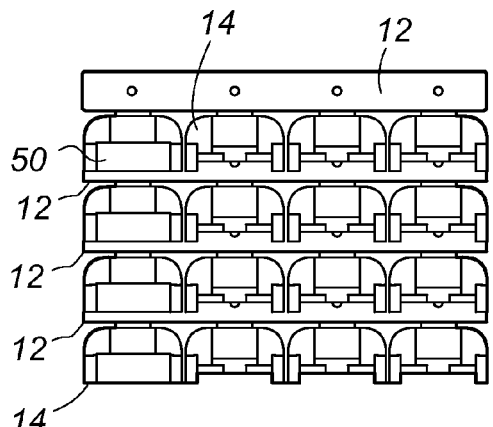
FIG. 7 is a plan view from above of a group of modular rack-mountable charging devices.
Figure 8:
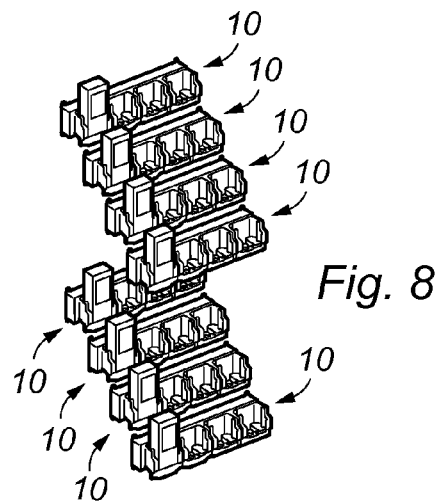
FIG. 8 is a perspective view of the group of eight rack-mountable charging devices of FIG. 7.
Figure 9:
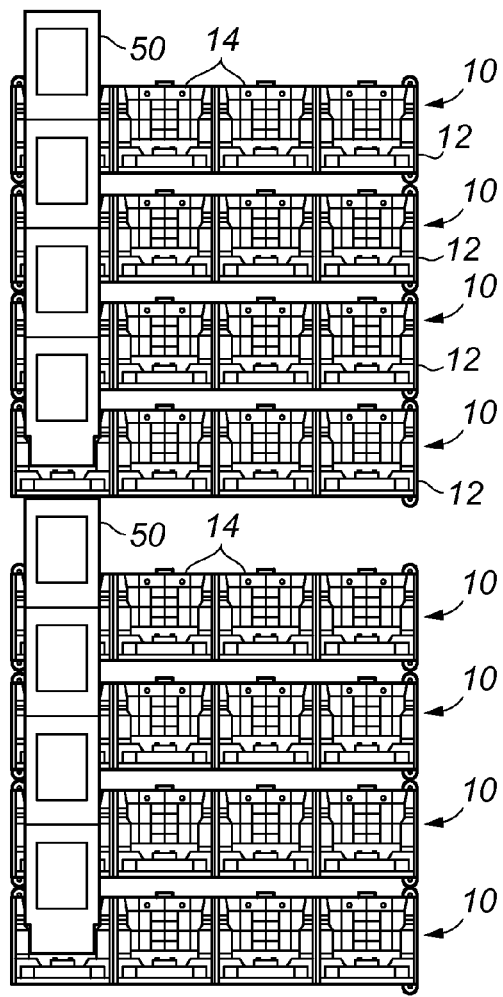
FIG. 9 is a front elevation of the group of eight rack-mountable charging devices of FIG. 7.
Figure 10:
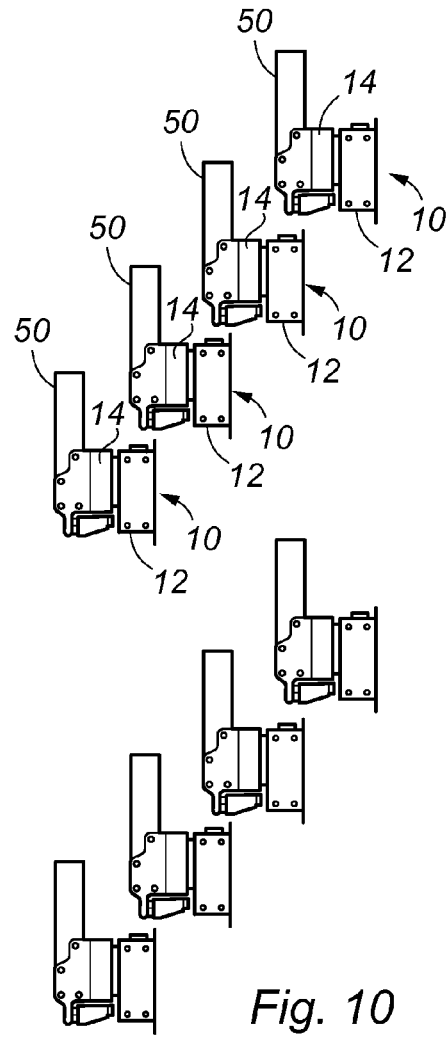
FIG. 10 is a side elevation of the group of eight rack-mountable charging devices of FIG. 7.

In the embodiment of the invention shown in FIGS. 1, 2 and 6, the chassis 12 can be affixed directly to the interior of a 19" server cabinet using screws that engage with screw holes 32 set in the ends of the chassis 12. However, in FIG. 3, a pair of wall-mounting brackets 34 are screwed to the screw holes 32, which brackets 34 have through holes 36 for screwing them to a wall. The wall mounting brackets 34 additionally comprise cable tidy hooks 38 to which the mains power lead and other wiring (not shown) can be affixed to keep it tidy.

Figure 4:
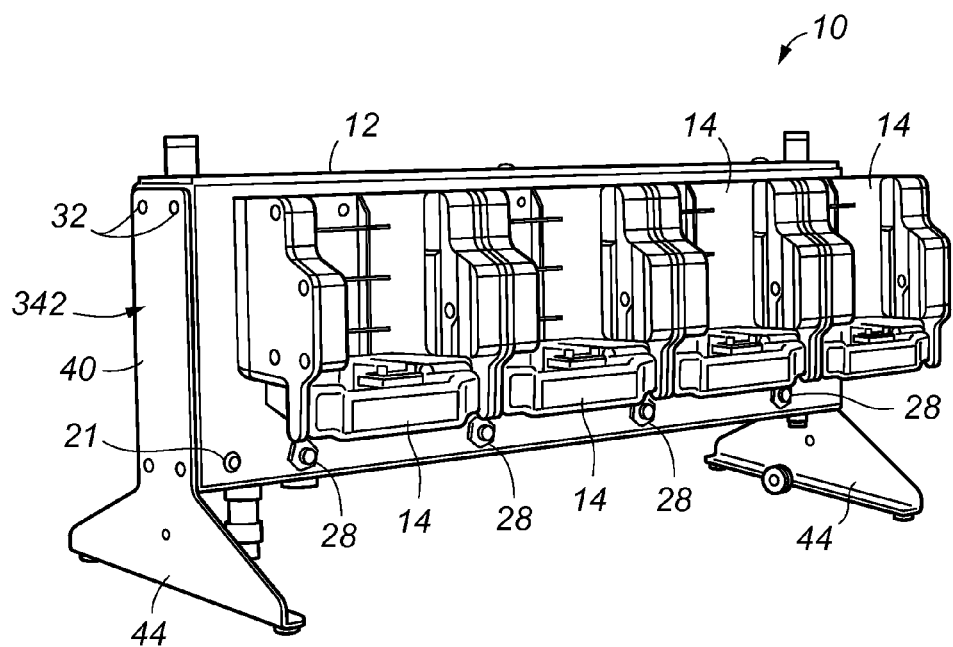
FIG. 4 is a perspective view of a desk-mountable version of the modular charging device of FIGS. 1 and 2 with four cradles attached.

In FIGS. 4 and 5, the wall-mounting brackets 34 previously described have been replaced by table stand attachments 40 having an upper limb portion 42 that connects to the ends of the chassis 12 using the screw holes 32 previously described and a wider lower foot portion 44 that can rest stably on a floor or table surface.

The power distribution circuit within the chassis 12 can, as previously described, also contain data distribution circuitry, which may be useful where devices need to be synchronized periodically, or where the devices are adapted to be charged using power-over-Ethernet, or powered USB technology. As such, the power outlet sockets 28 could be replaced or supplemented by network/data sockets, such as Ethernet sockets or USB sockets, so that data can be transferred to and/or from the connected devices whilst they are charging.

Finally, in FIGS. 7 to 10, it can be seen how several modular charging units according to the invention can be installed in an array within a server cabinet. In the example shown, several units 10 are installed at vertically at horizontally spaced-apart positions so as to form a cascade that facilitates insertion and removal of devices 50 from their respective cradles 14.

The invention is not restricted to the details of the foregoing embodiments, which are merely exemplary of the invention. For example, the type of cradle shown can be varied to suit different devices to be recharged, the materials and dimensions can be changed without departing from the scope of the invention.

What is claimed is:

1. A modular charging device comprising:
   a chassis;
   a plurality of cradles, each having a fly lead including a charging plug;
   a plurality of cradle mounts each adapted for detachably affixing one of the cradles to the chassis; and
   a power distribution unit comprising a power outlet corresponding to each of the cradle mounts,
   wherein the charging plug of each cradle is electrically connectable to the power distribution unit via the fly lead providing an electrical connection between the charging plug and the power outlet, and
   each cradle is specifically adapted to receive a particular model of portable, or hand-held, rechargeable device and comprises a plug-type power connector that engages with a charging socket of the rechargeable device when the rechargeable device is correctly seated in the cradle, thereby providing electrical power from the power distribution unit to the rechargeable device to recharge the device.

2. A modular charging device as claimed in claim 1, wherein the charging plug of each cradle is electrically connectable to the power distribution unit via electrical connections provided in the cradle mounts.

3. A modular charging device as claimed in claim 1, wherein the power distribution unit comprises a mains transformer.

4. A modular charging device as claimed in claim 3, further comprising a bracket for mounting the mains transformer on the exterior of the chassis.

5. A modular charging device as claimed in claim 1, wherein the power distribution unit comprises a power regulation and distribution circuit for delivering a controlled voltage and/or current to each of the power outlets.

6. A modular charging device as claimed in claim 1, wherein the power distribution unit comprises a data interface.

7. A modular charging device as claimed in claim 6, wherein the data interface comprises an Ethernet or USB interface.

8. A modular charging device as claimed in claim 7, wherein the power distribution unit comprises a power-over-Ethernet or powered USB interface.

9. A modular charging device as claimed in claim 1, wherein the chassis is wall-mountable.

10. A modular charging device as claimed in claim 9, further comprising a wall-mounting bracket or brackets for detachably affixing the chassis to a wall or other vertical surface.

11. A modular charging device as claimed in claim 1, wherein the chassis is free-standing.

12. A modular charging device as claimed in claim 11, further comprising one or more feet attachable to the chassis, said feet being adapted to enable the chassis to rest stably on a horizontal surface or table top.

13. A modular charging device as claimed in claim 1, wherein the chassis is mountable within a server cabinet.

14. A modular charging device as claimed in claim 13, wherein the width of the chassis is substantially 19" (480 mm) and wherein the ends of the chassis comprise screw-receiving apertures to enable the chassis to be secured within a server cabinet using screws.

15. A modular charging device as claimed in claim 1, wherein the chassis is formed from a pressed steel box.

16. A modular charging device as claimed in claim 1, comprising four of the cradle mounts.

17. A modular charging device as claimed in claim 1, wherein any one of the cradle mounts comprises a plastics injection molded quick release ratchet plate, to which cradles can be detachably affixed.

18. A modular charging device as claimed in claim 1, suitable for use with mobile communication devices that is modular to allow on site user repair or modification.

* * * * *